3,231,737
RADIOGRAPHIC AND PHOTOGRAPHIC COLOR IMAGES PRODUCED FROM THE SUPERPOSITION OF POSITIVE AND NEGATIVE IMAGES
Georg S. Mittelstaedt, 274 73rd St., Brooklyn 9, N.Y.
No Drawing. Filed Apr. 18, 1963, Ser. No. 273,826
8 Claims. (Cl. 250—65)

This application is a continuation-in-part of my copending application "Method of Density Differentiation in Radiography," Serial No. 113,582, filed April 18, 1961, and now Patent No. 3,121,792, granted February 18, 1964.

This invention relates to radiography and photography, and to new methods therefor; it relates to image reversal and to the superimposition of positive and negative images, and it relates to novel methods for improving density differentiation.

Objects of the invention are: to superpose positive and negative image; to produce radiographs with improved density differentiation; to produce radiographs with distinct color differentiation; to single out density variations in hard and/or soft substances; to define areas of nearly uniform opacity; to define hard substance and soft material in a color superimposition; to produce a positive-negative superimposition in contrasting colors in which each color defines a different density range; to produce a 3D effect in radiography.

Another object comprises methods for production, and further objects will appear from the detailed description below; but it must be understood that the description is illustrative and explanatory only, and the invention is not limited thereto, and various changes may be made without departing from the spirit and scope of the invention.

In order to produce a color radiograph, I produce a radiographic positive and negative of the same image, I color the positive and negative images in different colors, and I superpose the image in alignment or slightly out of alignment for identical areas.

In greater detail, the initial developed negative may have been obtained by exposing a preferably black and white photographic element to penetrating radiation through an object, causing the light sensitive layer to receive a photographic latent image which is subsequently developed and perhaps fixed, the image bearing layer usually containing dark or black areas of developed silver and transparent or translucent areas; or in some cases most or all areas of the image bearing layer may appear dark or black. The positive is produced in any known manner, for instance by subjecting a sensitive photographic element to suitable radiation through the developed negative, and the positive and negative images are colored and superimposed.

In the text and claims, by "penetrating radiation" or "penetrating rays" are also meant the converted penetrating rays formed in intensifying screens.

The coloring and superimposition is effected by projecting the positive and negative images through contrasting color filters on a screen, or contrasting color lights may be projected through the positive and negative images and be superposed, or the optical paths of the lights transmitted by the positive and negative images may be contrastingly colored in any other manner. Two separate projectors may be used, or a stereoscopic type projector may be utilized; or any suitable plural image, plural lens projector may be used to project each image through appropriate filters in superimposition on the screen.

In this invention superimposed color prints or transparencies of the positive and negative images may be made on color radiography emulsions (film, paper or other materials) through contrasting color filters. In a modification the positive and negative images may be dyed or otherwise colored in contrasting colors, and the images are superimposed by projection, printing or in any other suitable manner. Here it is to be noted that the differently colored positive and negative images are preferably monochromatic, and that color filters may be used in connection with the dyed or otherwise colored images to further improve color contrast.

In other modifications matrices from the positives and negatives may be dyed in contrasting colors and then transferred successively by imbibition etc. onto a single film; or prints may be made by the photoengraving process or similar methods, where a positive and a negative image are locally hardened or otherwise prepared, and are inked in respectively different colors, and the images are printed in superimposition. In fact, any means may be utilized to produce a positive-negative color superimposition.

In the claims, by "dyeing" is also meant inking; by "dye" is also meant ink.

In all these examples it is feasible to color only one of the images, the positive or the negative, to produce a form of superimposed color image.

The superimposition of the positive and negative images may be effected in alignment for identical areas, or slightly out of alignment, the latter for producing a 3D effect.

Each of above forms part of this invention, alone or in combination, and it is further to be noted that in this invention the coloring and superimposition of the positive and negative images may take any suitable physical or chemical form, depending on the method of image formation.

The initial radiographic negatives with their two-sided heavy coatings are usually unsuited for projection, especially color projection. The emulsions are too thick, and consequently the silver deposits are too heavy; but I discovered that a double reversal of the initial radiographic negative to a lighter image produces a projectable negative in which the density variations are clearly defined. In this process the initial negative is preferably double reversed on regular photographic film.

The double reversal of the initial radiographic negative or regular film produces a negative in which the emulsion thickness is about halved or greatly reduced relative to original radiographic negative, because only one side of the reversal film is coated. It can be seen that the silver densities are reduced in proportion. All this results in greater transparency and sharp definition of detail. If the exposure value of the double reversed negative is made to be lower than that of the initial negative, the clearness and definition of detail in the double reversed image is further improved.

The double reversal process to lighten or improve radiographic images may be applied to any form of radiography.

In the text and claims, by "developing the film" is also meant processing the image to a suitable form, perhaps a lighter form, which may include reversing or reproducing the image on new film to a lighter, more transparent image.

Similarly, when hard substance is to be defined, the initial radiographic element is often exposed to such a degree that the developed element is too dark for defining soft tissue. In this connection I find that a double reversal of the initial negative to a lighter image will produce a negative in which the density variations in soft tissue are clearly defined. Here too, the reversal film is preferably coated on one side only, for reducing the emulsion thickness and silver densities of the reversal relative to the initial radiographic negative; and the reversal image has preferably a lower exposure value than the initial negative for even better definition of detail in soft tissue.

It can be seen by my description that in my composite radiographic color images one color will primarily differentiate the density variations in hard substance, and the other color will define softer material.

For complete density differentiation in contrasting colors it is important that all areas of the positive and/or negative images are subjected to coloring in their respective colors, so that unexposed or little exposed areas are colored too, for producing in the superimposed image clear and sharp color differentiation between the very hard and the very soft areas of the object.

In an example, the positive and negative images were projected through red and blue filters respectively, and were superimposed in alignment for identical areas, resulting in a composite radiograph in which all areas were clearly differentiated in these contrasting colors.

Conventional plural-layer color film is not suited to produce the separate, differently colored positive and negative images; it produces under penetrating radiation a different color in each emulsion layer, resulting in a grayed-color image.

A density analysis is produced by exposing a sensitive photographic element through the initial radiographic negative so that the resulting positive has a lower exposure value than the original negative. The initial negative may be relatively overexposed for defining hard substance. The reversal element is preferably coated on one side only for reducing the emulsion thickness and silver densities of the positive relative to the initial negative. In this arrangement the negative will primarily define the high density range of the object, and the positive will define the lower density range. The positive and negative images may be colored in contrasting colors and may be superimposed, resulting in an analytical color image in which one color primarily defines one density range, the contrasting color defining another density range.

It must be understood that in this modification the initial radiographic negative may be double reversed on regular film, as above described, to lighten the negative image and for better definition of detail.

In an example the positive and negative images of different exposure values were projected through red and blue filters respectively and were superposed in alignment for identical areas, resulting in a composite radiograph in which blue defined the high density range only, and red defined the low and intermediate ranges.

In a similar example the positive and negative images were superposed slightly out of alignment for identical areas, resulting in a composite radiograph with a 3D effect in which blue defined the high density range, and red defined the lower range.

An arrangement may be used for producing a composite analytical color image comprising a plurality of successively disposed ray sensitive elements and a radiation absorbent screen or other exposure varying means placed between the sensitive elements. The arrangement is exposed to penetrating radiation through an object, resulting in successive photographic elements of unequal exposure value, defining different density ranges of the object in a negative image effect.

A positive is produced from one of the negatives, and the positive and a negative image are dyed in different colors, or are subjected to different color filters, or to other suitable coloring means. Superimposed color prints or transparencies may be made from the differently colored images. The positive and negative images may also be projected through contrasting color filters in superimposition on a screen or on any other suitable surface, so as to form a composite image in contrasting colors. The projected negative may be double reversed.

The positive may be superposed with a negative other than the one used in the reversal, resulting in an analytical image in contrasting colors, in which one color defines one density range of the object, the contrasting color defining another density range.

In an example, a positive was obtained from the negative having the highest exposure value, and a suitable negative was obtained by double reversal of one of the less exposed negatives (of course, the exposure values of the positive and negative could have been reversed). The positive and negative images were projected through contrasting color filters in superimposition on a screen, resulting in a composite radiographic image in which one color defined one density range, the contrasting color principally defining another density range.

In a similar example, only the less exposed image was colored by means of a color filter, resulting in a composite radiographic image in which white or off-white defined the highest density range, the contrasting color defining the lower and lowest densities.

In this invention, any means may be used to obtain positive and negative images of the same object. This also includes equal or unequal exposure of plural photographic films to the same object, developing the exposed films and reversing at least one film by reversal development or by any other means.

The principles involved in this invention may be applied to all fields of radiography and photography. It must be understood that this principle applies to all fields of photography and printing, with or without radiography.

In the text and claims, the terms "negative" and "positive" are also meant to be used in reversed order; by "film" is also meant sheet, plate or surface; by "color filters" is also meant colored film bases, etc.; by "black and white" is also meant the gray tones; by "radiographic" is also meant photographic; by "contrasting colors" is also meant the black and white tones in contrast to a color or shade of the spectrum; by "superimposing" is also meant composing or combining positive and negative images so as to form a composite image; by "coloring the positive and negative images in respectively contrasting colors" is also meant any of the following: coloring during development, coloring at least one of the images, using color filters or other optical coloring means, coloring the optical paths of the lights transmitted by the positive and negative images in respectively contrasting colors, coloring the optical path of the light transmitted by at least one of the images; by "light" is meant visible and/or invisible radiation; by "light image" is also meant ray image; by "transmitting light through the separate positive and negative images onto a common area" is also meant transmitting light through the separate positive and negative images onto a common ray-sensitive film area and developing the film; by "transmitting light" is also meant projecting light.

It must be understood that this invention relates to composite positive-negative images made with or without the use of penetrating rays, and in the claims, by "forming a negative image by exposing ray-sensitive film to penetrating rays emanating from a suitable source through an object and developing the film" is also meant forming a negative image by exposing ray-sensitive film to the light image emanating from an object, that is, photographing an object upon ray sensitive film and developing the film. Similarly, by "exposing two ray sensitive films to penetrating rays through an object" is also meant exposing two ray sensitive films to the same light image emanating from an object.

I claim:
1. A method of producing a composite positive-negative image comprising, forming a negative image by exposing ray-sensitive film to penetrating rays emanating from a suitable source through an object and developing the exposed film, forming a positive image of said object in addition to the negative image by exposing ray-sensitive film to radiation through the developed negative and developing the film, coloring the positive and negative images monochromatically in respectively contrasting colors and transmitting light through the separate positive and negative images onto a common area, thereby obtaining a composite positive-negative image.

2. A method of producing a composite positive-negative image comprising, forming a negative image by exposing ray-sensitive film to penetrating rays emanating from a suitable source through an object and developing the exposed film, forming a positive image of said object in addition to the negative image by exposing ray-sensitive film to radiation through the developed negative and developing the film, coloring the positive and negative images monochromatically in respectively contrasting colors and transmitting light through the separate positive and negative images slightly out of register onto a common area, thereby obtaining a composite positive-negative image in a 3D effect.

3. A method of producing a composite positive-negative image comprising, forming a negative image by exposing ray-sensitive film to penetrating rays emanating from a suitable source through an object and developing the exposed film, forming a positive image of said object in addition to the negative image by exposing ray-sensitive film to radiation through the developed negative to a lower exposure value than that of the negative and developing the film, coloring the positive and negative images monochromatically in respectively contrasting colors and transmitting light through the separate positive and negative images onto a common area, thereby obtaining a composite positive-negative image.

4. A method of producing a composite positive-negative image comprising, forming a negative image by exposing ray-sensitive film to penetrating rays emanating from a suitable source through an object and developing the exposed film, forming a positive image of said object in addition to the negative image by exposing ray-sensitive film to radiation through the developed negative and developing the film, coloring the positive and negative images in respectively contrasting colors, projecting light through the separate positive and negative images onto a common area, thereby obtaining a composite positive-negative image in contrasting colors, and photographing said composite positive-negative image.

5. A method of producing a composite positive-negative image from a radio-graphic negative formed by exposing ray-sensitive film to penetrating rays emanating from a suitable source through an object and developing the exposed film, comprising forming a positive image of said object in addition to said negative image by exposing ray-sensitive film to radiation through the developed negative and developing the film, coloring the positive and negative images in respectively contrasting colors and transmitting light through the separate positive and negative images onto a common light sensitive color film area and developing the film, thereby obtaining a composite positive-negative image.

6. A method of producing a composite positive-negative image comprising exposing two successively disposed ray-sensitive films to penetrating rays emanating from a suitable source through an object, developing one film to a negative image and developing the other film to a positive image, coloring the positive and negative images in respectively contrasting colors and transmitting light through the separate positive and negative images onto a common area, thereby obtaining a composite positive-negative image.

7. A method of producing a composite positive-negative image comprising, forming a negative image by exposing ray-sensitive film to the light image emanating from an object and developing the exposed film, forming a positive image in addition to the negative image by exposing ray-sensitive film to radiation through the developed negative and developing the film, processing the separate positive and negative films for dye transfer, dyeing the separate positive and negative images in respectively contrasting colors and transferring the dyes in succession by contact onto a common area so as to form a superimposition of the positive and negative images, thereby obtaining a composite positive-negative image.

8. A method of producing a composite positive-negative image comprising exposing two ray-sensitive films to the same light image emanating from an object, developing one film to a negative image and developing the other film to a positive image, processing the separate positive and negative films for dye transfer, dyeing the separate positive and negative images in respectively contrasting colors and transferring the dyes in succession by contact onto a common area so as to form a superimposition of the positive and negative images, thereby obtaining a composite positive-negative image.

References Cited by the Examiner

UNITED STATES PATENTS

| | | | |
|---|---|---|---|
| 1,585,264 | 5/1926 | Rosenthal | 250—61 |
| 2,844,734 | 7/1958 | Hartmann | 250—65 |
| 2,906,881 | 9/1959 | Mittelstaedt | 250—65 |
| 2,927,857 | 3/1960 | Phol | 96—2 |
| 3,114,833 | 12/1963 | Fine | 250—65 |

FOREIGN PATENTS

| | | |
|---|---|---|
| 389,808 | 6/1931 | Great Britain. |
| 752,125 | 7/1956 | Great Britain. |

RALPH G. NILSON, *Primary Examiner.*

ARCHIE R. BORCHELT, *Examiner.*

H. S. MILLER, A. L. BIRCH, *Assistant Examiners.*